(12) United States Patent
Ying

(10) Patent No.: US 10,538,286 B2
(45) Date of Patent: Jan. 21, 2020

(54) ELECTRIC BALANCING SWING CAR

(71) Applicant: HANGZHOU CHIC INTELLIGENT TECHNOLOGY CO., LTD, Hangzhou, Zhejiang (CN)

(72) Inventor: Jiawei Ying, Zhejiang (CN)

(73) Assignee: HANGZHOU CHIC INTELLIGENT TECHNOLOGY CO., LTD, Hangzhou, Zhejiang (CN)

( * ) Notice: Subject to any disclaimer, the term of this patent is extended or adjusted under 35 U.S.C. 154(b) by 106 days.

(21) Appl. No.: 15/767,645

(22) PCT Filed: Sep. 19, 2016

(86) PCT No.: PCT/CN2016/099353
§ 371 (c)(1),
(2) Date: Apr. 11, 2018

(87) PCT Pub. No.: WO2017/063477
PCT Pub. Date: Apr. 20, 2017

(65) Prior Publication Data
US 2018/0273130 A1 Sep. 27, 2018

(30) Foreign Application Priority Data

Oct. 12, 2015 (CN) .......................... 2015 1 0657676

(51) Int. Cl.
*B62K 11/02* (2006.01)
*B62K 11/00* (2006.01)
*B60K 1/02* (2006.01)

(52) U.S. Cl.
CPC ............ *B62K 11/02* (2013.01); *B62K 11/007* (2016.11); *B60K 1/02* (2013.01)

(58) Field of Classification Search
CPC ................................. B62D 11/007; B62D 1/02
See application file for complete search history.

(56) References Cited

U.S. PATENT DOCUMENTS

| 9,840,302 | B2 * | 12/2017 | Zeng .................... B62K 11/007 |
| 10,144,477 | B2 * | 12/2018 | Lankford ............. B62K 11/007 |
| 2016/0129963 | A1 * | 5/2016 | Ying .................... B62D 51/001 180/6.5 |

FOREIGN PATENT DOCUMENTS

| CN | 203268232 | 11/2013 |
| CN | 203381739 | 1/2014 |

(Continued)

OTHER PUBLICATIONS

"International Search Report (Form PCT/ISA/210)", dated Dec. 29, 2016, with English translation thereof, pp. 1-5.

*Primary Examiner* — Kevin Hurley
(74) *Attorney, Agent, or Firm* — JCIPRNET

(57) ABSTRACT

An electric balancing swing car comprises: supporting frameworks, including a first supporting framework and a second supporting framework that are symmetrically disposed and that can rotate relative to each other; a first wheel and a second wheel, connected to the first supporting framework and the second supporting framework respectively; a connecting device, which extends from the second supporting framework, is connected to the second supporting framework and is in rotation connection to the first supporting framework; a position sensor, disposed in the first supporting framework and used for sensing position information of the first supporting framework relative to the ground and movement change information of the second supporting framework relative to the first supporting framework; and a control device, used for driving, according to first position information obtained by the position sensor, the first wheel to rotate or move, and driving, according to the first position information and a rotation angle of the second supporting framework relative to the first supporting framework, the second wheel to rotate or move. In the electric balancing swing car, balancing movement of the car body can be (Continued)

implemented by using fewer sensors, and the whole structure is simple.

16 Claims, 2 Drawing Sheets

(56) References Cited

FOREIGN PATENT DOCUMENTS

| | | |
|---|---|---|
| CN | 103600795 | 2/2014 |
| CN | 103600801 | 2/2014 |
| CN | 104029769 | 9/2014 |
| CN | 104922893 | 9/2015 |

* cited by examiner

ELECTRIC BALANCING SWING CAR

CROSS-REFERENCE TO RELATED APPLICATION

This application is a 371 application of International PCT application serial no. PCT/CN2016/099353, filed on Sep. 19, 2016, which claims the priority benefit of China application no. 201510657676.2, filed on Oct. 12, 2015. The entirety of each of the abovementioned patent applications is hereby incorporated by reference herein and made a part of this specification.

BACKGROUND OF THE INVENTION

1. Field of the Invention

The present invention relates to an electric balancing swing car, in particular, to an electric balancing swing car with fewer position sensors and having simpler structure.

2. Description of Related Art

An electric balancing car is also referred to as a somatosensory car or a mind car. The operation principle thereof is mainly based on the basic principle that is referred to as "dynamic stability". The operation principle is using a gyroscope and an acceleration sensor inside a car body to detect the change of posture of the car body, and using a servo control system to accurately drive a motor to perform a corresponding adjustment, to keep the balance of the system.

The existing electric balancing cars can generally be categorized into two types, with or without an operating rod. Travelling, reversing and turning of the electric balancing car with the operating rod are all specifically operated and controlled by using the operating rod. Travelling and reversing of the electric balancing car without the operating rod are controlled by the incline of the whole electric balancing car, and turning is implemented by being controlled by a relative rotation angle difference between two footrest platforms that are pedaled by a user. A two-wheeled self-balancing electric balancing car disclosed in Patent CN201320300947 is a representative of a two-wheeled electric balancing car without an operating rod. Supporting frameworks in the two-wheeled self-balancing electric balancing car includes a left supporting framework and a right supporting framework that are symmetrically disposed. The left supporting framework is in rotation connection to the right supporting framework. A position sensor (an acceleration sensor) that can independently sense position information of the left supporting framework and the right supporting framework is disposed in each of the left supporting framework and the right supporting framework, used for sensing the position information of the left/right supporting frameworks, controlling the position information of the left/right supporting frameworks of a system, and respectively driving left/right wheels to rotate.

However, this electric balancing car requires many position sensors, and the structure is complicated.

SUMMARY OF THE INVENTION

The present invention provides an electric balancing swing car to overcome the related art.

An electric balancing swing car, wherein an electric balancing swing car includes:

supporting frameworks, comprising a first supporting framework and a second supporting framework that are symmetrically disposed and moveable relative to each other;

a first wheel, connected to the first supporting framework;

a second wheel, connected to the second supporting framework;

a connecting device, extending from the second supporting framework, wherein the connecting device is fixed to the second supporting framework, and is matched with and in a moveable connection to the first supporting framework;

a position sensor, disposed in the first supporting framework and used for sensing first position information of the first supporting framework relative to the ground and movement change information of the second supporting framework relative to the first supporting framework; and a control device, configured for driving the first wheel to rotate or move according to the first position information obtained by the position sensor, and driving the second wheel to rotate or move according to the first position information and the movement change information.

The connecting device comprises a rotation mechanism, the rotation mechanism is in rotation connection to the first supporting framework, and the movement change information is a rotation angle of the second supporting framework relative to the first supporting framework.

The position sensor comprises a position sensing unit and a movement change information sensing unit.

The position sensing unit comprises a gyroscope and an acceleration sensor.

The movement change information sensing unit comprises a linear Hall sensor, a rotary encoder and ultrasonic angle measurement.

The rotation mechanism is an axle sleeve, and a bearing that is matched with the axle sleeve is disposed in the first supporting framework.

The electric balancing swing car further comprises a clamp spring that is mounted in an end portion of the axle sleeve and abuts against the bearing.

An inward end head of the first supporting framework comprises a tube which is cylindrical, and the bearing and the axle sleeve are mounted from outside to inside in the tube through the clamp spring.

The electric balancing swing car further comprises a limiting axle, one end of the limiting axle is connected to the second supporting framework, and the other end of the limiting axle extends to the first supporting framework; and the first supporting framework is correspondingly provided with a limiting groove configured for matching the limiting axle, to implement limiting of rotation angles of the first supporting framework and the second supporting framework by gap fitting of the limiting axle and the limiting groove.

A first footrest area and a second footrest area are disposed in the first supporting framework and the second supporting framework respectively, when the first footrest area is pedaled, the first position information of the first supporting framework is sensed by the position sensor, when the second footrest area is pedaled, relative rotation of the second supporting framework relative to the first supporting framework generates a rotation angle, and the control device calculates the second position information of the second supporting framework by combining the rotation angle and the first position information thereby driving the second wheel to rotate or move.

The electric balancing swing car further comprises a power supply and a drive apparatus, the power supply is configured for supplying electrical power to the drive apparatus, the position sensor and the control device, and the control device is configured for controlling the power supply, the drive apparatus and the position sensor, and for sending a drive signal to the drive apparatus according to the first position information and a rotation angle that are sensed by the position sensor, thereby driving wheels to rotate.

The two wheels are parallel to each other, and are disposed on two opposite sides of the supporting frameworks respectively.

The electric balancing swing car further comprises an upper cover and a lower cover, the upper cover and the lower cover are disposed by wrapping the supporting frameworks.

Alternatively, an electric balancing swing car includes:

supporting frameworks, comprising a first supporting framework and a second supporting framework that are symmetrically disposed and moveable relative to each other;

a first wheel, connected to the first supporting framework;

a second wheel, connected to the second supporting framework;

a connection device, connecting the first supporting framework and the second supporting framework, and one end of the connecting device is fixed to the first supporting framework or the second supporting framework;

a position sensor, disposed in the first supporting framework or the second supporting framework, and configured for sensing a position information of the corresponding first supporting framework or second supporting framework relative to the ground and a movement change information between the first supporting framework and the second supporting framework; and a control device, configured for driving the first wheel and the second wheel to rotate or move according to the position information and the movement change information obtained by the position sensor.

The connecting device extends from the first supporting framework into the second supporting framework, the connecting device is fixed to the first supporting framework, and the position sensor is disposed in the first supporting framework.

Alternatively, an electric balancing swing car includes:

supporting frameworks, comprising a first supporting framework and a second supporting framework that are symmetrically disposed and moveable relative to each other;

a first wheel, connected to the first supporting framework;

a second wheel, connected to the second supporting framework;

a connecting device, extending from the second supporting framework, wherein the connecting device is fixed to the second supporting framework, and is matched with and in a moveable connection to the first supporting framework;

a position sensor, comprising a position sensing unit and a movement change information sensing unit, wherein the position sensing unit is disposed in the first supporting framework, and is configured for sensing a first position information of the first supporting framework relative to the ground, and the movement change information sensing unit is disposed on the connecting device, and is configured for sensing a movement change information of the second supporting framework relative to the first supporting framework;

a control device, configured for driving the first wheel to rotate or move according to the first position information obtained by the position sensor, and driving the second wheel to rotate or move according to the first position information and the movement change information.

Because of application of the foregoing technical solutions, the present invention has the following advantages:

In the electric balancing swing car of the present invention, the position sensor needs to be disposed on only one side of the supporting frameworks, and by optimization of a control manner, the position information of the first supporting framework and the second supporting framework can be obtained at the same time; and the second supporting framework is fixedly connected to the rotation mechanism, and no complicated rotation mechanism is needed, thereby effectively simplifying the circuit and the structure of the electric balancing swing car, and reducing the costs.

DESCRIPTION OF THE EMBODIMENTS

To make the objectives, technical solutions, and advantages of the present invention clearer and more comprehensible, the following further describes the present invention in detail with reference to the accompanying drawings and embodiments. It should be understood that the embodiments herein are provided for describing the present invention and not intended to limit the present invention.

Figure 1:
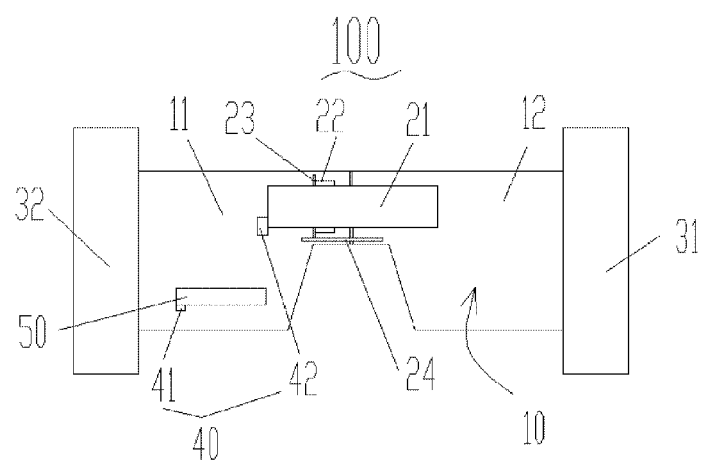
FIG. 1 is a schematic diagram of an electric balancing swing car according to an embodiment of the present invention.
Figure 2:
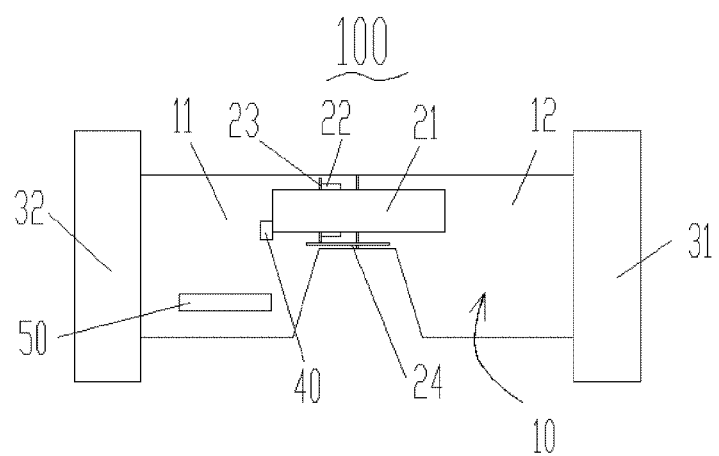
FIG. 2 is a schematic diagram of an electric balancing swing car according to another embodiment of the present invention.

Referring to FIG. 1 and FIG. 2, an electric balancing swing car 100 provided in the present invention comprises supporting frameworks 10, two wheels, a connecting device, a control device 50 that specifically controls the two wheels, and an electric drive system mainly comprising a power supply (not shown), a drive apparatus and a position sensor 40. The control device 50 is electrically connected to the power supply, the drive apparatus and the position sensor 40 respectively, controls the wheels 30 by using information of the supporting frameworks 10 sensed by the position sensor 40, and further implements travelling, reversing or turning of the electric balancing swing car 100.

The supporting frameworks 10 comprise a first supporting framework 11 and a second supporting framework 12 that are symmetrically disposed and that can rotate relative to each other. It can be understood that the first supporting framework 11 and the second supporting framework 12 are only for ease of description of the present invention and simplification of the description, cannot be understood as two particular parts in the supporting frameworks 10. Similarly, the two wheels in the present embodiment are defined as a first wheel 31 and a second wheel 32 respectively. The first wheel 31 and the first supporting framework 11 are assembled, and the second wheel 32 and the second supporting framework 12 are assembled. In the present embodiment, the two wheels are parallel to each other, and are disposed on two opposite sides of the supporting frameworks 10 respectively.

It can be understood that the connecting device is applied in the electric balancing swing car 100, and is used for connecting the first supporting framework 11 and the second supporting framework 12 in the supporting frameworks 10. Specifically, the connecting device extends from the second supporting framework 12 to the first supporting framework 11, is fixedly connected to the second supporting framework 12, and is matched with and in moveable connection to the first supporting framework 11, so that the electric balancing swing car 100 can travel, reverse and turn.

As a preferred solution of the present invention, the electric balancing swing car 100 in the present embodiment further comprises an upper cover (not shown) and a lower cover (not shown). The upper cover and the lower cover are disposed by wrapping the supporting frameworks 10, to prevent dust or liquid from entering the supporting frameworks 10, and further guarantee normal use of the electric balancing swing car.

In the present embodiment, the connecting device comprises a rotation mechanism. The rotation mechanism is in rotation connection to the first supporting framework 11, and is fixedly connected to the second supporting framework 12. Further, the rotation mechanism is an axle sleeve 21, and a bearing 22 that is matched with the axle sleeve 21 is disposed in the first supporting framework 11. It can be understood that the axle sleeve 21 is of an axial hollow structure. In this way, during assembling of the electric balancing swing car 100, some wirings that are used for connecting the first supporting framework 11 and the second supporting framework 12 may directly penetrate through a hollow part of the axle sleeve 21. In this way, wirings are protected, and the whole structure of the electric balancing swing car 100 is simplified. Therefore, the rotation mechanism in the present embodiment further comprises a clamp spring 23. Specifically, the clamp spring 23 is sleeved in an end portion of the axle sleeve 21 and abuts against the bearing 22, to implement limiting of the bearing 22. Correspondingly, an inward end head of the first supporting framework 11 comprises a cylindrical tube, and the bearing 22 and the axle sleeve 21 are mounted from outside to inside in the tube through the clamp spring 23.

It can be understood that during use of the electric balancing swing car 100 in the present embodiment, the first supporting framework 11 in the supporting frameworks 10 of the electric balancing swing car 100 may rotate relative to the second supporting framework 12. Correspondingly, in the present embodiment, the electric balancing swing car 100 further comprises a limiting axle 24, used for limiting a rotation angle between the first supporting framework 11 and the second supporting framework 12. Specifically, one end of the limiting axle 24 is connected to the second supporting framework 12, and the other end of the limiting axle 24 extends into the first supporting framework 11; and the first supporting framework 11 is correspondingly provided with a limiting groove (not shown) used for matching the limiting axle 24, to implement limiting of rotation angles of the first supporting framework and the second supporting framework by gap fitting of the limiting axle 24 and the limiting groove.

The position sensor 40 is applied in the electric balancing swing car 100, is disposed in the first supporting framework 11, and is used for sensing first position information of the first supporting framework 11 relative to the ground and movement change information of the second supporting framework 12 relative to the first supporting framework 11. It can be understood that the movement change information in the present embodiment is specifically a rotation angle of the second supporting framework 12 relative to the first supporting framework 11.

The position sensor 40 specifically comprises a position sensing unit 41 and a movement change information sensing unit 42. The position sensing unit 41 is used for sensing the first position information of the first supporting framework 11 relative to the ground. The movement change information sensing unit 42 is used for sensing the movement change information of the second supporting framework 12 relative to the first supporting framework 11, that is, sensing the rotation angle of the second supporting framework 12 relative to the first supporting framework 11. It can be understood that according to use requirements, the position sensing unit 41 and the movement change information sensing unit 42 in the position sensor 40 may be set to be an integrated structure, and be disposed on the rotation mechanism. Alternatively, the position sensing unit 41 and the movement change information sensing unit 42 may be set to be individuals. The position sensing unit 41 is specifically disposed on the control device 50 located in the first supporting framework 11, and the movement change information sensing unit 42 is assembled on the rotation mechanism. Further, the position sensing unit 41 may be a gyroscope, an acceleration sensor or a combination of the gyroscope and the acceleration sensor. Certainly, the position sensing unit 41 may alternatively be other sensors. During use of the position sensing unit 41, a first position of the first supporting framework 11 relative to the ground is detected. It can be understood that a first position of the first supporting framework 11 relative to the ground sensed by the position sensing unit 41 in actual operation is a tilt position of the first supporting framework 11 relative to the ground. The movement change information sensing unit 42 comprises a linear Hall sensor, a rotary encoder, ultrasonic angle measurement or other sensors, and senses the rotation angle of the second supporting framework 12 relative to the first supporting framework 11 by using a sensing manner of a corresponding sensor.

The control device 50 is applied in the electric balancing swing car 100, and is used for driving, according to first position information obtained by the position sensor 40, the first wheel 31 to rotate or move, and driving, according to the first position information and the movement change information, the second wheel 32 to rotate or move. In the present embodiment, during control of the control device 50 to the second wheel 32, a second position information of the second supporting framework 12 may be obtained by reasonable calculation with reference to the first position information of the first supporting framework 11 sensed by the position sensing unit 41 in the position sensor 40 and the rotation angle of the second supporting framework 12 relative to the first supporting framework 11, thereby implementing driving and controlling the second wheel 32.

It can be understood that to cater to a using habit of a user to the electric balancing swing car 100, in the electric balancing swing car 100 of the present embodiment, a first footrest area (not shown) and a second footrest area (not shown) are disposed in the first supporting framework 11 and the second supporting framework 12 respectively. When the first footrest area is pedaled, the first position information of the first supporting framework 11 is sensed by the position sensor, when the second footrest area is pedaled, relative rotation of the second supporting framework 12 relative to the first supporting framework 11 generates a rotation angle, and the control device 50 calculates, by combining the rotation angle and the first position information, second position information of the second supporting framework 12, thereby driving the second wheel 32 to rotate or move.

Based on the above, in the electric balancing swing car of the present invention, the position sensor needs to be disposed on only one side of the supporting frameworks, and by optimization of a control manner, the position information of the first supporting framework and the second supporting framework can be obtained at the same time; and the second supporting framework is connected to the rotation mechanism, and no complicated rotation mechanism is needed, thereby effectively simplifying a circuit and the structure of the electric balancing swing car, and reducing the costs.

Although the present invention has been disclosed above in exemplary embodiments, they are not intended to limit the present invention. Any person skilled in the art may make various variations and modifications to the present invention, without departing from the spirit or scope of the present invention. Therefore, the protection scope of present invention is defined by the claims.

What is claimed is:

1. An electric balancing swing car, comprising:
   supporting frameworks, comprising a first supporting framework and a second supporting framework that are symmetrically disposed and moveable relative to each other;
   a first wheel, connected to the first supporting framework;
   a second wheel, connected to the second supporting framework;
   a connecting device, extending from the second supporting framework, wherein the connecting device is fixed to the second supporting framework, and is matched with and in a moveable connection to the first supporting framework;
   a position sensor, disposed in the first supporting framework and configured for sensing a first position information of the first supporting framework relative to the ground and a movement change information of the second supporting framework relative to the first supporting framework; and
   a control device, configured for driving the first wheel to rotate or move according to the first position information obtained by the position sensor, and driving the second wheel to rotate or move according to the first position information and the movement change information.

2. The electric balancing swing car according to claim 1, wherein the connecting device comprises a rotation mechanism, the rotation mechanism is in rotation connection to the first supporting framework, and the movement change information is a rotation angle of the second supporting framework relative to the first supporting framework.

3. The electric balancing swing car according to claim 2, wherein the position sensor comprises a position sensing unit and a movement change information sensing unit.

4. The electric balancing swing car according to claim 3, wherein the position sensing unit comprises a gyroscope and an acceleration sensor.

5. The electric balancing swing car according to claim 3, wherein the movement change information sensing unit includes a linear Hall sensor, a rotary encoder, and ultrasonic angle measurement.

6. The electric balancing swing car according to claim 2, wherein the rotation mechanism is an axle sleeve, and a bearing that is matched with the axle sleeve is disposed in the first supporting framework.

7. The electric balancing swing car according to claim 6, wherein the electric balancing swing car further comprises a clamp spring that is mounted in an end portion of the axle sleeve and abuts against the bearing.

8. The electric balancing swing car according to claim 7, wherein an inward end head of the first supporting framework comprises a tube which is cylindrical, and the bearing and the axle sleeve are mounted from outside to inside in the tube through the clamp spring.

9. The electric balancing swing car according to claim 2, wherein the electric balancing swing car further comprises a limiting axle, one end of the limiting axle is connected to the second supporting framework, and the other end of the limiting axle extends to the first supporting framework; and the first supporting framework is correspondingly provided with a limiting groove configured for matching the limiting axle, to implement a limiting of rotation angles of the first supporting framework and the second supporting framework by a gap fitting of the limiting axle and the limiting groove.

10. The electric balancing swing car according to claim 2, wherein a first footrest area and a second footrest area are disposed in the first supporting framework and the second supporting framework respectively, when the first footrest area is pedaled, the first position information of the first supporting framework is sensed by the position sensor, when the second footrest area is pedaled, a relative rotation of the second supporting framework relative to the first supporting framework generates a rotation angle, and the control device calculates the second position information of the second supporting framework by combining the rotation angle and the first position information thereby driving the second wheel to rotate or move.

11. The electric balancing swing car according to claim 1, wherein the electric balancing swing car further comprises a power supply and a drive apparatus, the power supply is configured for supplying electrical power to the drive apparatus, the position sensor and the control device, and the control device is configured for controlling the power supply, the drive apparatus and the position sensor, and for sending a drive signal to the drive apparatus according to the first position information and a rotation angle that are sensed by the position sensor, thereby driving wheels to rotate.

12. The electric balancing swing car according to claim 1, wherein the two wheels are parallel to each other, and are disposed on two opposite sides of the supporting frameworks respectively.

13. The electric balancing swing car according to claim 1, wherein the electric balancing swing car further comprises an upper cover and a lower cover, the upper cover and the lower cover are disposed by wrapping the supporting frameworks.

14. An electric balancing swing car, comprising:
    supporting frameworks, comprising a first supporting framework and a second supporting framework that are symmetrically disposed and moveable relative to each other;
    a first wheel, connected to the first supporting framework;
    a second wheel, connected to the second supporting framework;
    a connection device, connecting the first supporting framework and the second supporting framework, and one end of the connecting device is fixed to the first supporting framework or the second supporting framework;
    a position sensor, disposed in the first supporting framework or the second supporting framework, and configured for sensing a position information of the corresponding first supporting framework or second supporting framework relative to the ground and a movement change information between the first supporting framework and the second supporting framework; and
    a control device, configured for driving the first wheel and the second wheel to rotate or move according to the position information and the movement change information obtained by the position sensor.

15. An electric balancing swing car according to claim 14, wherein the connecting device extends from the first supporting framework into the second supporting framework, the connecting device is fixed to the first supporting framework, and the position sensor is disposed in the first supporting framework.

16. An electric balancing swing car, comprising:
supporting frameworks, comprising a first supporting framework and a second supporting framework that are symmetrically disposed and moveable relative to each other;
a first wheel, connected to the first supporting framework;
a second wheel, connected to the second supporting framework;
a connecting device, extending from the second supporting framework, wherein the connecting device is fixed to the second supporting framework, and is matched with and in a moveable connection to the first supporting framework;
a position sensor, comprising a position sensing unit and a movement change information sensing unit, wherein the position sensing unit is disposed in the first supporting framework, and is configured for sensing a first position information of the first supporting framework relative to the ground, and the movement change information sensing unit is disposed on the connecting device, and is configured for sensing a movement change information of the second supporting framework relative to the first supporting framework; and
a control device, configured for driving the first wheel to rotate or move according to the first position information obtained by the position sensor, and driving the second wheel to rotate or move according to the first position information and the movement change information.

* * * * *